Sept. 9, 1941. O. KRUH 2,255,549
METHOD FOR PRODUCING ALUMINUM, BERYLLIUM, CHROMIUM,
MAGNESIUM, AND ALLOYS OF THESE METALS
Filed Oct. 6, 1939
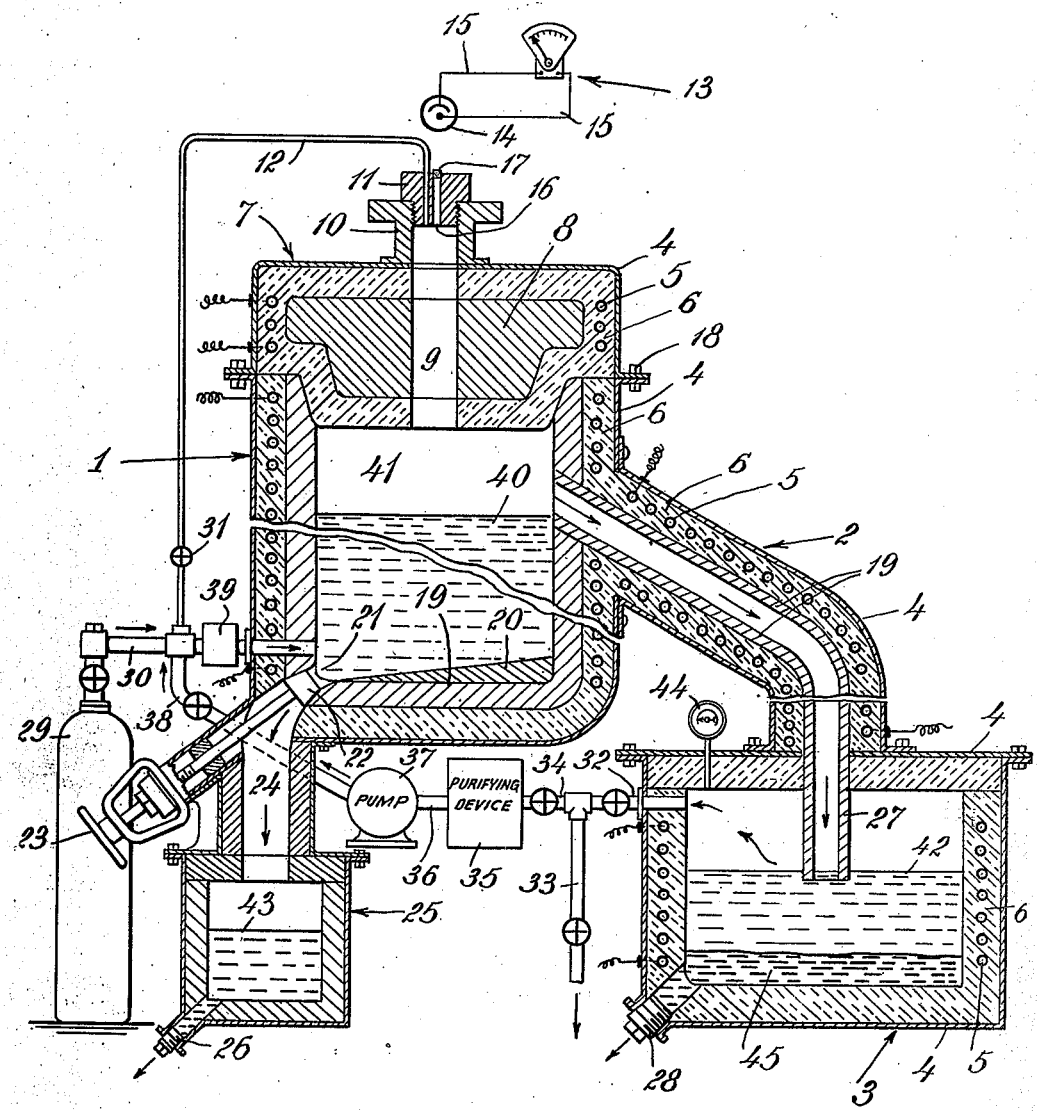
INVENTOR
OSIAS KRUH
BY
ATTORNEYS Patented Sept. 9, 1941

2,255,549

UNITED STATES PATENT OFFICE 2,255,549

METHOD FOR PRODUCING ALUMINUM, BERYLLIUM, CHROMIUM, MAGNESIUM, AND ALLOYS OF THESE METALS

Osias Kruh, Brooklyn, N. Y.

Application October 6, 1939, Serial No. 298,189
In Germany October 6, 1938

7 Claims. (Cl. 75—10)

This invention relates to the metallurgy of metals such as aluminum, beryllium, chromium, magnesium and the like, as well as to their alloys, and has for its object certain improvements in the method of manufacturing such metals and their alloys, as well as certain valuable by-products produced during the practice of the invention.

The metals aluminum, beryllium and magnesium are manufactured at present by electrolyzing fused salts, necessitating the use of very high currents of low voltage and of comparatively small furnace units. The material from which these metals are gained must be chemically pure, as otherwise impure metals result. Pure chromium is manufactured by reducing pure chromium oxide with aluminum powder.

It has also been proposed to produce these metals by reducing their oxides with the aid of carbon at a high temperature. My United States Patents 2,090,451 and 2,121,084 describe the reduction of aluminum oxide and of beryllium oxide by the aid of carbon in a stream of hydrogen at a temperature higher than the boiling points of those metals. Since carbon monoxide is formed simultaneously, it is necessary to use a sufficient amount of inert gas, such as hydrogen or argon, in the furnace and in the space the metallic vapors pass before they condense, because otherwise the metals tend to re-oxidize. However, this re-oxidation cannot be entirely avoided since a certain, though very small, part of those metals is re-oxidized. Even this very small percentage of oxygen in the condensed metal causes serious difficulties, because the metal oxide assumes the shape of a thin film or membrane, perhaps of atomic dimensions as regards its thickness, which envelops the metal particles. So even a small amount of oxygen suffices to separate a large amount of metal particles from each other. The melting points of those metal oxides being high, it is quite difficult to obtain a coherent liquid bath of the metals, even when heating them far above their melting points. My present invention has for its object to obviate such difficulties.

According to my invention, this object is reached by removing the carbon monoxide formed in the furnace, and then distilling the metals when the reaction is finished. The carbon monoxide is removed from all parts of the apparatus through which the metallic vapors pass. This is effected by reducing the metal oxides with the aid of carbon under pressure sufficiently high to prevent the metals from distilling at the temperature of reaction. As soon as the carbon monoxide is removed, the pressure is lowered, the metals are distilled and their vapors are condensed in a suitable receptacle.

If, for instance, aluminum is to be manufactured, a mixture of aluminum oxide and carbon is put into a furnace of the general kind described by Hutton and Petavel in Phil. Trans. of the Royal Society 207 (1908) 446, but with many changes and improvements necessary for the practice of this process. Electric energy is made to enter the furnace, and when the temperature of the charge is so high that all water is removed, the outlet of the apparatus is closed and the temperature of the charge is raised to about 2300° C. At this temperature, aluminum oxide is reduced, and on account of the evolving carbon monoxide, a pressure of 100 atmospheres is soon obtained, so that aluminum, which boils at one atmosphere at 2270° C., remains in a liquid state in the furnace. A manometer shows the pressure in the furnace, and when the pressure of 100 atmospheres is obtained, the outlet of the furnace is opened so that this pressure remains continuously in the furnace during the reduction. This may be effected automatically if the pressure varies between two values, and this variation is used to actuate the opening or closing of the outlet of the furnace. As soon as the manometer does not fluctuate in its indications, the reaction is nearly finished.

Dry preheated hydrogen, or other gas that is inert under the conditions, such as argon, of equal pressure and of equal temperature is then conducted into and through the furnace, by the aid of which carbon monoxide is removed from the furnace and from all parts connected with it through which the metallic vapors pass and wherein they condense. This is ascertained by chemical or spectroscopic analysis of the outflowing hydrogen. If the hydrogen should form an objectionable amount of acetylene under any given set of operating conditions, which would in turn form carbides with the metal vapors, it is best to use argon.

The vapor pressure of aluminum at a temperature of 2300° C. is less than two atmospheres, so that the outflow of carbon monoxide would remove from the furnace continuously a certain amount of aluminum which would cause a loss of a certain percentage of aluminum. This loss may be diminished by raising the pressure in the furnace to 300 atmospheres. For this reason, I use another way that does not necessitate such high pressures.

Aluminum oxide is reduced readily at temperatures lower than the boiling point of aluminum. If enough carbon is present, all of the aluminum oxide is reduced and converted into aluminum carbide. Otherwise all of these constituents are found: aluminum, aluminum oxide and aluminum carbide. Since the vapor pressure of aluminum carbide is lower than that of aluminum, a lower pressure of carbon monoxide may be used during the reduction. As soon as the reduction is finished, the same process with hydrogen is employed, as before, and as soon as carbon monoxide cannot be ascertained in the outflowing hydrogen, the temperature of the aluminum carbide is raised to 2300° C., the aluminum carbide decomposes and aluminum boils. The aluminum vapor is conducted together with the hydrogen to the condensing chamber, wherein it is liquified and forms a coherent liquid body. The carbon present in the aluminum carbide remains in the furnace and may be used for the second charge. This process does not require more energy since the result is the same: aluminum and carbon monoxide.

The process of reducing the oxides of aluminum, beryllium, magnesium and chromium by the aid of carbon at a high temperature under pressure and distilling those metals after carbon monoxide has been removed from the furnace and from the other parts of the apparatus, results in many advantages over the other proposals referring to the electrothermal manufacture of those metals. In accordance with the present process, the metal is vaporized into an atmosphere free of oxygen so that the metallic vapor passes the space between the furnace and the place wherein it condenses without oxidation. The liquefied condensed metal may, therefore, be cast into bars. Since carbon monoxide is for the most part removed before hydrogen is let into the furnace, a relatively small amount of hydrogen is required to sweep out the remaining carbon monoxide. The cost of preheating the hydrogen to the temperature of reaction, and the cost of separating the hydrogen from the admixed carbon monoxide are therefore not considerable. If the reduction is performed at a certain minimum pressure, the dust in the furnace stays there and does not stop up its outlet, nor does it deposit in the condensing chamber.

According to a presently preferred practice of the invention, the condensation of the vaporized metal is effected in a molten salt, which does not attack the condensed metal. The specific weight of the salt should be lower than that of the condensed metal, so that the liquid metal may settle to the bottom of the bath of fused salt. The melting point of the salt should exceed that of the condensing metal, for example, by a hundred degrees. In case of the manufacture of aluminum, molten cryolite is well adapted for the purpose, but other salts of similar properties may be used for the same purpose. It is very convenient to heat cryolite by the action of high frequency current. Since cold cryolite is a nonconductor, it is necessary to melt it outside of the container and to pour the hot cryolite into the container. Or, if aluminum is added to cryolite, the high frequency current fuses first aluminum, which, in turn, fuses the cryolite.

In fusing metals by high frequency currents, the surface of the molten metal stands higher in its centre than in the neighborhood of the wall of the container. This effects a motion of the molten metal from the central part of the furnace to the wall of the container, and from there to its bottom. I use this phenomenon, which also takes place in fused cryolite, if heated by high frequency current, to remove the condensing metal particles by the aid of the flow of cryolite from the center of the surface of the fused cryolite to the wall of the container, and from there to its bottom. A continuously renewing surface of molten salt is, therefore, offered to the arriving and condensing metal particles. As soon as the contents of aluminum are enriched, the metal particles fuse to larger drops, which settle at the bottom of the container and form there a coherent body. The aluminum may be tapped in a manner well known to the art. Since the container of cryolite is filled with hydrogen of a high pressure, a suitable sluice is provided for the tapping of the aluminum. This method allows the condensation of aluminum in a space instead of on a cooled surface. The heat of condensation of aluminum which is set free may be used for the preheating of the hydrogen. This is an improvement over the method of condensation described in my above-mentioned United States patents.

In the case of the manufacture of other metals, other fused salts should be used. For instance, in the case of magnesium, magnesium fluoride or double salts of magnesium fluoride and magnesium chloride are advantageously employed in which to condense magnesium vapors; but other salts of similar properties may of course be used for the same purpose.

Contrary to the electrolytic processes for manufacturing pure metals, no pure raw materials are required in this process. Furthermore, whereas the electrolytic industry requires a certain amount of carbon of the highest quality for its electrodes to manufacture a given amount of these metals, in accordance with the present process the same amount of metals may be produced with substantially the same amount of carbon, but of low quality, such as ordinary coke, so far as impurities are concerned. It is to be noted that coke contains some impurities which are likewise reduced. If, for instance, the coke contains 4% of aluminum oxide, 5% of iron oxide, 6% of silica and 2% of water, there remains for the reduction of aluminum oxide only 75.32% of active carbon. This process allows the use of ores of the metals that are to be manufactured. If the ore is too poor, it should be enriched by the methods well known in the art. Instead of chemical processes I use electric energy for the separation of the metals from the impurities not wanted. The impurities are converted into valuable byproducts that pay for the additional use of electric energy.

In the accompanying drawing, I have illustrated diagrammatically an apparatus illustrative of a practice of the invention. Briefly, the apparatus consists of an induction furnace 1, a conduit 2, and a condenser 3 appropriately connecting one another. Each unit is covered by a metal casing 4, and is also provided with a separate series of current and water-carrying copper tubes 5 embedded in an appropriate layer of insulating material 6, such as beryllium oxide adapted to withstand very high temperatures. Each series of tubes is connected to a transformer (not shown) and a source of electrical current, so that each unit may be heated by induction.

Referring to the specific construction of the reduction furnace, it will be seen that it is provided with a removable top 7, the core 8 consisting of material, such as tungsten, adapted to withstand high temperatures. A passageway 9 extends centrally through the top, and connects with the passageway of a connecting member 10 secured to the furnace top, into which a fixed plug 11 is screwed. A valved conduit 12 of small diameter extends through the plug for the introduction of a stream of inert gas adapted to sweep the conduit 9 substantially clear of products of reduction which tend to accumulate therein.

A temperature indicating device 13 is associated with the top of the reduction chamber, and advantageously consists of a photo-electric bulb 14 and a pair of leads 15 connecting the bulb with the temperature indicator; the bulb being located directly over a passageway 16 extending through the plug 11, in alignment with the passageway 9. The passageway 16 is provided with a suitable quartz window 17 adapted to let light pass from the reduction furnace to the bulb 14. The top may be removed from and non-leakably secured to the main reaction chamber by the use of removable bolts 18.

The reduction chamber is provided at its sides and bottom with a graphite lining 19, the bottom portion 20, also of graphite, being inclined, as shown, in order to cause its contents to flow toward and into an opening 21 at the bottom of the chamber. The opening is in turn provided with a removable plug 22 suitably attached to a plug-inserting and removing means 23 of conventional construction.

The opening 21 communicates with a suitably insulated passageway 24 leading into a heat insulated receptacle 25 adapted to receive liquified products of reduction from the reaction chamber, such as ferro-silicon and the like. This receptacle is provided with a removable plug arrangement 26, similar to the one above described. As is indicated by the drawing, non-leakable joints are provided so that pressures may be built up in the system.

The conduit 2 is also provided with a graphite lining and extends from near the top of the reduction chamber to the top of the condenser, as shown. An extension conduit 27 runs from the end of conduit 2 well into the interior of the condenser 3.

The condenser is designed to contain a fused bath of salt or mixture of salts inert to the metals to be recovered, the bath to be maintained at a level or just above the lower end of the extension conduit 27. The condenser is provided with a removable plug 28 similar in construction to those described above.

As is shown by the drawing, the above-described apparatus is suitably equipped with conduits and means for supplying a continuous stream of inert gas, such as hydrogen or argon, successively through the reduction chamber, the conduit and the condenser. The drawing shows a conventional metal container or bottle 29 adapted to contain a supply of the inert gas. A conduit 30 connects the outlet of the tank with the reduction chamber, and is also provided with a valved outlet 31 adapted to connect with the conduit 12 provided in the plug 11 of the reduction furnace.

A valved conduit 32 extends through the upper portion of the condenser, and connects with a valved outlet 33 for the removal of undesirable carbon monoxide and other gaseous reaction products from the system. This conduit advantageously connects with suitable receptacles for the collection and treatment of the carbon monoxide.

Another conduit 34 connects with a purifying device 35, a conduit 36, a pump 37, a valved conduit 38, which in turn connects with conduit 30 leading through a preheater 39 into the reduction chamber. Said purifying device is adapted to remove such gases as nitrogen, oxygen and moisture. Suitable chemicals for this purpose are molten aluminum, magnesium and other similarly reacting metals.

From what has been said above, the operation of the apparatus in the practice of the process of the invention will be quite clear. A charge 40 of the ore of the metal to be treated in oxide form, and an appropriate amount of carbonaceous reducing agent, such as coke, is introduced in the reduction chamber 41. The top 7 may be removed for the introduction of the charge, or the charge may be passed through the passageway 9 on removing the connecting member 10 or the plug 11. In order to remove silica from the charge, an appropriate amount of iron filings are admixed with the ore and carbon. The iron combines with the silica to form a ferro-silicon alloy with the aid of the carbon. The iron also acts as a conductor for induced electric current and thus facilitates heating of the charge.

In order to condense the metal vapor to be produced, a suitable salt or mixture of salts 42 is placed in condenser 3, in amount sufficient to provide a fused bath of the salt at the level of or slightly above the lower end of extension conduit 27.

The entire system is heated by passing suitable electrical current through copper tubes 5, and the tubes are cooled by passing water therethrough, in a manner known to the art. As the charge reaches its reduction temperature, carbon monoxide is formed, and perhaps some other reaction gases. The charge is maintained under a predetermined and sufficiently high pressure to retain the reduced metal within the reduction zone until the reaction has gone to substantial completion. In a modification of the process, particularly for the production of such metals as aluminum, beryllium, or their alloys, and chromium, the oxide of the metal to be treated is heated in the presence of a sufficient amount of the carbonaceous reducing agent to form a carbide of the metal, the charge being maintained at a predetermined pressure and temperature to assure the formation of a carbide of the metal, and its retention as such; so that the metal carbide is not decomposed or vaporized at that temperature and pressure.

As the reaction continues in the reduction chamber, a by-product 43, such as ferro-silicon, is formed, which collects at the bottom of the chamber. This is tapped by means of the withdrawal of plug 22, when the ferro-silicon runs into and is deposited within receptacle 25. During this operation, the system is maintained under appropriate pressure, as will be shown by the pressure indicating device 44.

An inert gas, such as hydrogen or argon, contained in metal bottle 29 is then fed through conduit 30 and the preheater 39 into the reduction chamber 41 at a temperature and pressure equal to that maintained within the chamber. A sufficient amount of the inert gas is thus introduced to sweep out carbon monoxide still left in the system. For this purpose, the inert gas passes in, through, and over the charge into the free space above the charge, thence through conduit 2 into the condenser 3, from which it passes through conduits 32 and 33 to the open atmosphere or preferably to a holder or container for subsequent treatment to recover or utilize the valuable carbon monoxide.

After the carbon monoxide has thus been removed from the system, the valve in conduit 33 is closed, pump 37 is put in operation, and a continuous stream of inert gas is passed successively through the reduction chamber, the conduit and the condenser. The inert gas leaving the condenser is passed through the purifying device 35, in which oxygen, nitrogen and moisture are removed. A certain amount of the gas is by-passed through conduit 31, and passed into and downwardly through the passageway 9 in order to sweep the passageway clear of products of reduction that would otherwise tend to collect therein.

The temperature of the reduced metal in the reduction chamber is then raised to its boiling point while still maintaining the system under pressure. In the case of the metal carbide, the temperature is raised until the carbide is decomposed and metal vapor is evolved. In either case, the resulting metal vapor is passed in the presence of the inert gas from the reduction chamber through the conduit to the condenser 3, in which the metal vapor is condensed. Due to the fact that the specific gravity of the fused molten salt in the condenser is lower than that of the metal to be recovered, the condensed metal particles coalesce and merge into a liquid that settles out at the bottom in the form of a layer 45, which may be tapped as desired.

After the charge in the reduction chamber has been treated in the manner indicated, a new charge is introduced. If, during the production of metal from the previous charge, the metal was converted to a carbide, the decomposition results in the release of carbon or graphite particles that are permitted to remain in the reduction chamber and to become a part of the carbonaceous reducing agent used to treat the newly introduced charge of ore.

I now give three examples of how the process may be applied for the manufacture of the metals mentioned. This method, however, is also generally appliable for other metals if they have similar properties.

Example 1

If aluminum is to be gained from bauxite, the ore the electrolytic industry generally uses, the bauxite may contain more than 3% of silica, a limit for chemical purification as now in use. In the United States an electrothermal process is in use, by means of which chemically pure aluminum oxide, or nearly so, is manufactured for the electrolytic process. According to this process the impurities of the ore bauxite and of the coke are reduced and an alloy therefrom is formed, consisting of iron, silicon, titanium and some aluminum. This alloy is a by-product of the process, and the sale of it nearly pays the cost of the process. This process I modify in such a manner that it can be used for the direct manufacture of aluminum.

Bauxite contains a considerable amount of water, which can be removed only at a temperature of about 400° C. For this purpose, special furnaces are used, like the furnaces used for making cement. Supposing this bauxite has been already freed from water and that it contains 67.3% of aluminum oxide, 21.5% of iron oxide, 8.2% of silica and 3% of titanium oxide, then it is mixed with coke in such proportion that aluminum oxide is reduced to aluminum carbide; and the impurities of the bauxite and of the coke are reduced to iron, silicon and titanium, which at a temperature of about 2100° C. form a liquid alloy that settles at the bottom of the furnace. The furnace being closed, the pressure rises therein on account of the evolved carbon monoxide, and likewise in the condensing chamber connected with the furnace by a tube that can be heated to a temperature higher than the boiling point of the metal to be gained, until a pressure of 100 atmospheres is reached. This pressure is kept up during the reduction and distillation by the mechanism mentioned, while the surplus of carbon monoxide is drawn off and accumulated in special containers.

As soon as the reaction is finished, the alloy is drawn off into a sluice, wherein it is cooled to a lower temperature and then tapped off. Preheated dry hydrogen of equal temperature and equal pressure is led into the furnace, and the carbon monoxide is removed from the furnace and from the connecting tube and condensing chamber. The resulting mixture of hydrogen and carbon monoxide is accumulated in special containers for the purpose of recovering the hydrogen according to known processes. As soon as the last traces of carbon monoxide are removed from the furnace and from the condensing chamber, the temperature of the aluminum carbide is raised to 2300° C., at which temperature it decomposes and aluminum distills and condenses in the condensing chamber. The last traces of aluminum carried away by the outflowing hydrogen are retained by electrical and mechanical sieves; from which they are removed by dipping in fused cryolite.

During the reduction and distillation, the pressure in the furnace is kept at least at such a value that unreduced particles and graphite stay in the furnace. The graphite remaining from the decomposition of the aluminum carbide is almost sufficient for the aluminum carbide of a new charge, so that only a small surplus of coke is required in all the following charges. 100 kg. of bauxite of the composition above mentioned give 35 kg. of aluminum, 20 kg. of a ferro-titano-silicon alloy, consisting of 15 kg. of iron, 2 kg. of titanium and 3 kg. of silicon. The coke used in the reduction gives in addition, 1.1 kg. of aluminum, which joins the aluminum of the bauxite, 1.9 kg. of iron, and 1.8 kg. of silicon, which join the alloy gained from the bauxite, and to this 75.25 kg. of carbon monoxide.

Example 2

In the case of manufacturing beryllium, I use the ore beryl as a material to start with. According to its chemical formula $3BeO.Al_2O_3.6SiO_2$, it contains 5.048% of beryllium, 10.35% of aluminum, 31.325% of silicon and 53.585% of oxygen. These figures refer to pure beryl ore. Commercial beryl ore contains a smaller percentage of beryllium. The amount of coke must be so calculated that beryllium and aluminum carbides are formed and silica is reduced to silicon. Iron filings are added in order to form a ferro-silicon alloy, preferably containing 75% of iron, as this alloy melts at a comparatively low temperature. The reduction is performed in the same manner as in Example 1, the pressure in the furnace is about 100 atmospheres, and the temperature of the first reaction is about 2100° C. The silicon forms with the added iron an alloy which fuses and settles at the bottom of the furnace, as described. As soon as the reaction is finished, hydrogen is added as before described, and the temperature is raised to about 2300° C., at which temperature the carbides of beryllium and aluminum decompose, the metals beryllium and aluminum vaporize and condense in the condensing chamber containing a fused salt, such as the double salts of sodium-beryllium fluoride, at a temperature of 1300° C. The result is an alloy containing about 33% of beryllium and 67% of aluminum. The separation of both metals is accomplished by distilling this alloy in vacuo containing hydrogen of 5 mm. pressure, at a temperature of 1530° C. at which temperature beryllium sublimates, while aluminum remains in the residue. 100 kg. of beryl give 5 kg. of beryllium, 10 kg. of aluminum, 97.9 kg. of a ferro-silicon alloy and 117 kg. of carbon monoxide.

*Example 3*

In the case of manufacturing magnesium from the ore magnesite by reducing it with coke, it is to be considered that magnesite is composed of magnesium carbonate with some impurities consisting of about 4% aluminum oxide, 5% iron oxide and 2% of silica. So the ore has to be first freed from carbon dioxide, by heating the ore up to 500° C., at which temperature the whole of the carbon dioxide is removed and accumulated in special receptacles, from which the gas is transferred to steel bottles by means of pumps which compress the carbon dioxide to such a pressure that it becomes liquid, and is sold as such. The remainder of the ore is mixed with coke in such proportions that magnesium oxide is reduced to magnesium, the aluminum oxide from the ore and the coke to aluminum carbide, the iron oxide to iron, and the silica to silicon. Preferably so much iron filings are added that a ferro-silicon alloy is obtained containing 75% of iron. The temperature of reaction is 2300° C., at which temperature all of the reactions are performed. On account of the very low boiling point of magnesium, a pressure of about 300 atmospheres is to be maintained during the reduction. As soon as the reaction is finished hydrogen is led into the furnace, which removes the carbon monoxide. The pressure is then lowered to about 50 atmospheres, at which temperature both magnesium and aluminum boil, while the alloy remains in the furnace and is tapped off. The condensing chamber contains fused calcium fluoride and magnesium chloride. The liquid alloy of magnesium and aluminum is brought into a distilling apparatus, from which magnesium is distilled off, while aluminum remains in the residue. 100 kg. magnesite give 44.88 kg. carbon dioxide, 26.01 kg. of magnesium, 2.54 kg. of aluminum, and with 2 kg. of iron filings added, an alloy of 8 kg. of ferro-silicon and 38 kg. of carbon monoxide.

It will be clear to those skilled in this art that a great saving of heat can be effected by circulating the inert gas from the condenser to the reduction chamber. As the gas leaves the condenser it is highly heated by the heat given up by the metal vapors as they condense. To prevent substantial heat loss, the gas carrying conduit, and its intermediate devices, are well insulated.

I claim:

1. In the manufacture of metals selected from the group consisting of aluminum, beryllium, chromium, magnesium and alloys of these metals, the improvement which comprises subjecting the oxide of the metal to reduction in the presence of a carbonaceous reducing agent, maintaining the charge under a predetermined and sufficiently high pressure to retain the reduced metal within the reduction zone until the reaction has gone to substantial completion, introducing an inert gas in amount sufficient to sweep substantially all of the carbon monoxide and other gaseous products of reduction from the system, raising the temperature of the reduced metal to its boiling point while still maintaining the system under pressure, passing the resulting metal vapor in the presence of the inert gas from the reduction to a condensing zone, and condensing the metal vapor in the presence of the inert gas to form a molten bath of the metal.

2. Method according to claim 1, in which the charge of metal oxide and carbonaceous reducing agent is admixed with iron, and high frequency induction current is employed to heat the charge to the reduction point of the metal oxide and the boiling point of the metal.

3. Method according to claim 1, in which the inert gas is preheated to substantially the temperature of the charge and passed into the reduction zone at substantially the same pressure under which it is maintained.

4. Method according to claim 1, in which a stream of the inert gas is continuously and successively re-circulated through the reduction and condensing zones.

5. Method according to claim 1, in which the metal vapor is condensed within an inert molten bath of salt having a specific gravity less than that of the condensed metal.

6. In the manufacture of metals selected from the group consisting of aluminum, beryllium, chromium and alloys of these metals, the improvement which comprises subjecting the oxide of the metal to reduction in the presence of a sufficient amount of carbonaceous reducing agent to form a carbide of the metal, maintaining the charge under a predetermined and sufficiently high pressure to retain the metal in carbide form, introducing an inert gas in amount sufficient to sweep substantially all of the carbon monoxide and other gaseous products of reduction from the system, raising the temperature of the reduced metal to its boiling point while still maintaining the system under pressure, passing the resulting metal vapor in the presence of the inert gas from the reduction to a condensing zone, and condensing the metal vapor in the presence of the inert gas to form a molten bath of the metal.

7. Method according to claim 1, in which the reduction is made to take place at a pressure sufficiently large to cause an outlet from the reduction zone of the furnace to be kept open.

OSIAS KRUH.